(12) United States Patent
Nakano et al.

(10) Patent No.: US 7,102,709 B2
(45) Date of Patent: Sep. 5, 2006

(54) COLOR-FILTER SUBSTRATE ASSEMBLY, METHOD FOR MANUFACTURING THE COLOR-FILTER SUBSTRATE ASSEMBLY, ELECTRO-OPTICAL DEVICE, METHOD FOR MANUFACTURING THE ELECTRO-OPTICAL DEVICE, AND ELECTRONIC APPARATUS

(75) Inventors: Tomoyuki Nakano, Toyoshina (JP); Keiji Takizawa, Hoicka (JP); Chihiro Tanaka, Matsumoto (JP); Hideki Kaneko, Shiojiri (JP)

(73) Assignee: Seiko Epson Corporation, (JP)

( * ) Notice: Subject to any disclaimer, the term of this patent is extended or adjusted under 35 U.S.C. 154(b) by 202 days.

(21) Appl. No.: 10/872,158

(22) Filed: Jun. 18, 2004

(65) Prior Publication Data

US 2004/0233353 A1 Nov. 25, 2004

Related U.S. Application Data

(63) Continuation of application No. 10/214,393, filed on Aug. 6, 2002, now abandoned.

(30) Foreign Application Priority Data

| Aug. 7, 2001 | (JP) | ............................. 2001-239608 |
| Jul. 3, 2002 | (JP) | ............................. 2002-195213 |

(51) Int. Cl.
  *G02F 1/1335* (2006.01)
  *G02F 1/136* (2006.01)

(52) U.S. Cl. .................... 349/106; 349/44; 349/113; 349/114

(58) Field of Classification Search .................. 349/44, 349/106, 113, 114
See application file for complete search history.

(56) References Cited

U.S. PATENT DOCUMENTS

| 6,208,395 B1 | 3/2001 | Kanoh et al. |
| 6,476,890 B1 | 11/2002 | Funahata et al. |

(Continued)

FOREIGN PATENT DOCUMENTS

EP 1 069 460 1/2001

(Continued)

OTHER PUBLICATIONS

Communication from Japanese Patent Office regarding counterpart application.

(Continued)

*Primary Examiner*—Tarifur R. Chowdhury
(74) *Attorney, Agent, or Firm*—Harness, Dickey & Pierce, P.L.C.

(57) ABSTRACT

A color-filter substrate assembly 10 includes a substrate 3b having a rugged surface, a light-shield layer 7a arranged on the substrate 3b, and having a rugged surface conformal to the rugged surface of the substrate 3b, a reflective layer 5 arranged on the light-shield layer 7a and having a rugged surface conformal to the rugged surface of the light-shield layer 7a, and a color layer 4 arranged on the substrate 3b. The light-shield layer 7a has an aperture 8, and the reflective layer 5a has an aperture 6, and is covered with the color layer 4. The invention provides a color-filter substrate assembly which is inexpensive, and provides, in the simple structure thereof, excellent functionality with a light-shield function, such as of a black mask, and a scattering function for a reflective-type display when the color-filter substrate assembly is used in an electro-optical device (such as a reflective-type liquid-crystal display device or a transflective-type liquid-crystal display device).

19 Claims, 11 Drawing Sheets

U.S. PATENT DOCUMENTS 6,697,137 B1 * 2/2004 Nemoto et al. ............. 349/113
6,850,297 B1 * 2/2005 Takizawa et al. ........... 349/114

FOREIGN PATENT DOCUMENTS

| JP | 09-015418 | 1/1997 |
| JP | 2000-131685 | 5/2000 |
| JP | 2001-033778 | 2/2001 |
| JP | 2001-194662 | 7/2001 |
| JP | 2003-057636 | 2/2003 |
| JP | 2003-121831 | 4/2003 |
| WO | WO00/45215 | 8/2000 |
| WO | WO00/45216 | 8/2000 |

OTHER PUBLICATIONS

Communication from Japanese Patent Office re: counterpart application.

* cited by examiner

(a) STRIPE

(b) MOSAIC (c) DELTA

COLOR-FILTER SUBSTRATE ASSEMBLY, METHOD FOR MANUFACTURING THE COLOR-FILTER SUBSTRATE ASSEMBLY, ELECTRO-OPTICAL DEVICE, METHOD FOR MANUFACTURING THE ELECTRO-OPTICAL DEVICE, AND ELECTRONIC APPARATUS

CROSS-REFERENCE TO RELATED APPLICATION

This application is a continuation of U.S. Ser. No. 10/214,393 filed on Aug. 6, 2002, now abandoned claiming priority to Japanese Application Nos. 2001-239608 filed Aug. 7, 2001 and 2002-195213 filed Jul. 3, 2002, all of which are hereby incorporated by reference.

BACKGROUND OF THE INVENTION

1. Technical Field

The present invention relates to a color-filter substrate assembly, a method for manufacturing the color-filter substrate assembly, an electro-optical device, a method for manufacturing the electro-optical device, and electronic apparatus. More specifically, the present invention relates to a color-filter substrate assembly which is inexpensive, and provides excellent functionality with a light-shield function, such as a black mask, and a scattering function for a reflective-type display when the color-filter substrate assembly is used in a liquid-crystal display device (such as a reflective-type liquid-crystal display device or a transflective-type liquid-crystal display device). The present invention also relates to a method for manufacturing the color-filter substrate assembly, a liquid-crystal display device, a method for manufacturing the liquid-crystal display device, and electronic apparatus.

2. Description of the Related Art

Liquid-crystal display devices are widely used in electronic apparatus such as a mobile telephone or a mobile personal computer. Liquid-crystal display devices having a structure presenting a color display using a color-filter substrate assembly are also widely used.

Figure 10:
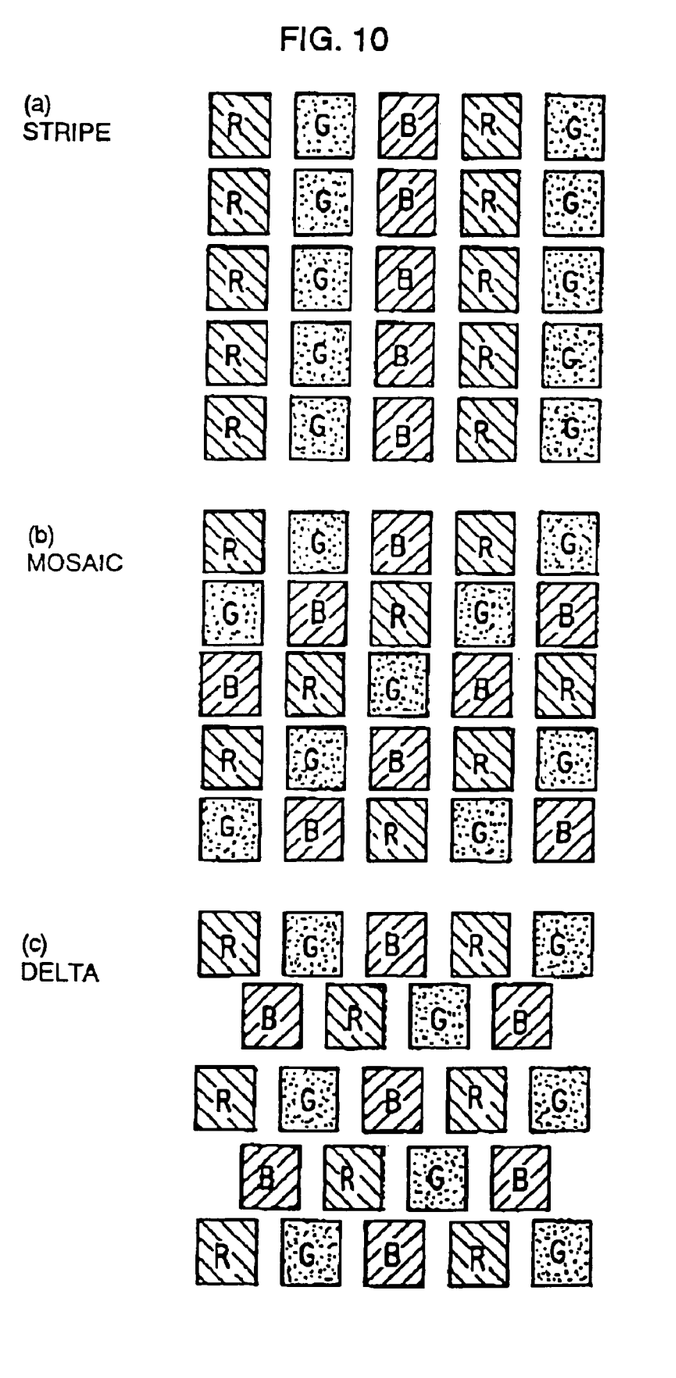

In known color-filter substrate assemblies, R (red), G (green), and B (blue) color layers are arranged in a stripe configuration, a mosaic configuration, or a delta configuration on the surface of a substrate formed of glass or plastic (see FIG. 10).

A so-called transflective-type liquid-crystal display device switches as necessary between a reflective-type display which allows external light such as natural light or room illumination light to enter the device from a viewer's side of the device and to present a display by reflecting the light, and a transmissive-type display which allows light from a light source to enter the device from the side opposite to the viewer's side to present a display.

Figure 11:
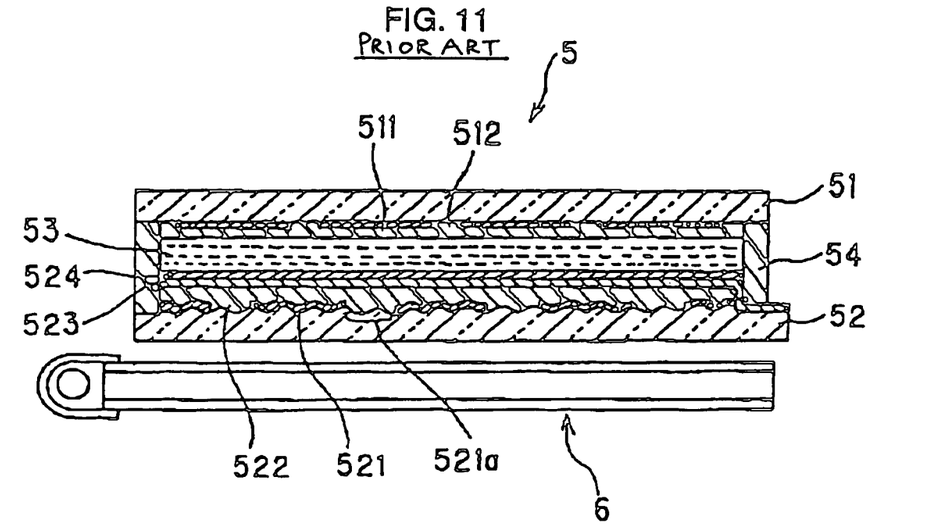
FIG. 11 is a cross-sectional view diagrammatically illustrating a conventional transflective-type liquid-crystal display device.

FIG. 11 is a cross-sectional view diagrammatically illustrating a conventional transflective-type active-matrix liquid-crystal display device including a TFD (Thin-Film Diode) as a two-terminal switching element.

Referring to FIG. 11, the liquid-crystal display device includes a liquid-crystal panel 5 formed of a first substrate 51, a second substrate 52, and a sealing member 54 interposed therebetween, a liquid crystal 53 encapsulated between the two substrates, and a backlight unit 6 arranged on the outside of the second substrate 52 of the liquid-crystal panel 5. Arranged on the first substrate 51 are a matrix of pixel electrodes 511 connected to scanning lines (not shown) through TFDs (not shown) and an alignment layer 512. Arranged on the second substrate 52 are a reflective layer 521 covering most of the second substrate 52. The reflective layer 521 is directly formed on the second substrate 52 fabricated of glass which is etched for frosting, or the reflective layer 521 is formed on a rugged layer (not shown) of an acrylic resin having a rugged surface, or in case of a color display, a color layer (not shown) is laminated on the surface of the reflective layer 521. A planarization layer 522 covering the second substrate 52 having the reflective layer 521 formed thereon, a plurality of band-like counter electrodes 523 extending in a direction intersecting the scanning lines, and an alignment layer 524 are also provided for panel 5. In this arrangement, light incident on the first substrate 51 is reflected from the surface of the reflective layer 521 on the second substrate 52 and exits from the first substrate 51. A reflective-type display is thus presented. The reflective layer 521 has apertures 521a respectively corresponding to pixel electrodes 511. Light emitted from the backlight unit 6 is incident on the second substrate 52, passes through the apertures 521a, and exits from the first substrate 51. A transmissive-type display is thus presented.

Figure 12:
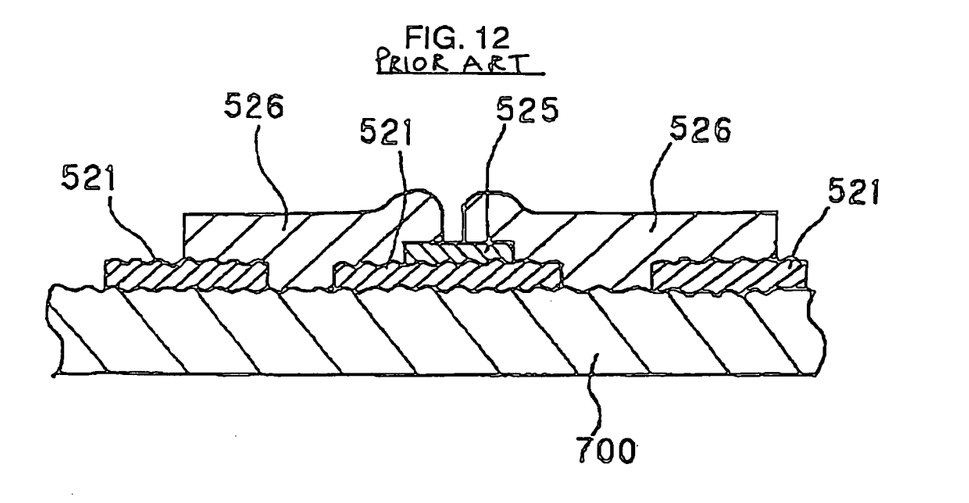
FIG. 12 is a cross-sectional view diagrammatically illustrating a light-shield layer (a black mask or a black matrix) used in a conventional liquid-crystal display device.

To present a color display on a conventional liquid-crystal display device shown in FIG. 12, a light-shield layer (a black mask or a black matrix) 525 for defining a color layer formation region and shielding a margin between color layers is formed on the reflective layer 521 formed on a light-shield layer 700 or a substrate (not shown), and a color layer 526 is formed in the color layer formation region defined by the light-shield layer (black mask or black matrix) 525.

In the conventional liquid-crystal display device, both the light-shield layer 700 and the light-shield layer (black mask or black matrix) 525 must be formed, thereby not only complicating the manufacturing process and resulting in a cost increase, but also giving rise to a functional problem of a drop in light reflectance due to unwanted light-shield layer (residuals) on the reflective layer.

SUMMARY OF THE INVENTION

In view of the above problem, the present invention has been developed. It is an object of the present invention to provide a color-filter substrate assembly which is inexpensive, and provides, in the simple structure thereof, excellent functionality with the light-shield function, such as of a black mask, and the scattering function for a reflective-type display when the color-filter substrate assembly is used in a liquid-crystal display device (especially a reflective-type liquid-crystal display device or a transflective-type liquid-crystal display device), and also to provide a method for manufacturing the color-filter substrate assembly, a liquid-crystal display device, a method for manufacturing the liquid-crystal display device, and electronic apparatus.

To achieve the above object, a color-filter substrate device of the present invention includes a substrate, a light-shield layer which is arranged on the substrate and substantially shields light, a reflective layer which is arranged on the light-shield layer and substantially reflects light, and a color layer arranged on the reflective layer, wherein the reflective layer includes an aperture.

Also, a color-filter substrate assembly of the present invention includes a substantially transparent substrate, a light-shield layer which is arranged on the substrate and substantially shields light, a reflective layer which is arranged on the light-shield layer and substantially reflects light, and a color layer arranged on the substrate, wherein the light-shield layer includes an aperture, and wherein the reflective layer includes an aperture and is covered with the color layer.

When the color-filter substrate assembly thus constructed is used in an electro-optical device (such as a reflective-type liquid-crystal display device or a transflective-type liquid-crystal display device), the color-filter substrate assembly becomes inexpensive and provides, in the simple structure thereof, excellent functionality with a light-shield function, such as of a black mask, and a scattering function for a reflective-type display.

Also, a method of the present invention for manufacturing a color-filter substrate assembly, includes a step of forming a light-shield layer, which substantially shields light, on a substrate, a step of forming a reflective layer, which substantially reflects light, on the light-shield layer, and a step of forming a color layer on the reflective layer, wherein an aperture is formed in the reflective layer in the step of forming the reflective layer.

Further, a method of the present invention for manufacturing a color-filter substrate assembly, includes a step of forming a light-shield layer, which substantially shields light, on a substantially transparent substrate, a step of forming a reflective layer, which substantially reflects light, on the light-shield layer, a step of forming a color layer on the substrate, wherein an aperture is formed in the light-shield layer in the step of forming the light-shield layer, wherein an aperture is formed in the reflective layer in the step of forming the reflective layer, and wherein the reflective layer is covered with the color layer in the step of forming the color layer.

In the above arrangements, the color-filter substrate assembly is efficiently manufactured at low costs.

Also, an electro-optical device of the present invention includes a pair of substrates, a light-shield layer which is arranged on one of the pair of substrates and substantially shields light, a reflective layer which is arranged on the light-shield layer and substantially reflects light, and a color layer arranged on the reflective layer, wherein the reflective layer includes an aperture.

Further, an electro-optical device of the present invention includes a pair of substrates, a light-shield layer which is arranged on one of the pair of substrates and substantially shields light, a reflective layer which is arranged on the light-shield layer and substantially reflects light, and a color layer arranged on the reflective layer, wherein the one of the pair of substrates is substantially transparent, wherein the light-shield layer includes an aperture, and wherein the reflective layer includes an aperture and is covered with the color layer.

In the above arrangements, a low-cost electro-optical device with excellent functionality results.

Also, a method of the present invention for manufacturing an electro-optical device, includes a step of forming a light-shield layer, which substantially shields light, on a substrate, a step of forming a reflective layer, which substantially reflects light, on the light-shield layer, and a step of forming a color layer on the reflective layer, wherein an aperture is formed in the reflective layer in the step of forming the reflective layer.

Further, a method of the present invention for manufacturing an electro-optical device, includes a step of forming a light-shield layer, which substantially shields light, on a substantially transparent substrate, a step of forming a reflective layer, which substantially reflects light, on the light-shield layer, and a step of forming a color layer on the substrate, wherein an aperture is formed in the light-shield layer in the step of forming the light-shield layer, wherein an aperture is formed in the reflective layer in the step of forming the reflective layer, and wherein the reflective layer is covered with the color layer in the step of forming the color layer.

In the above arrangements, an electro-optical device with excellent functionality is manufactured at low costs.

Also, electronic apparatus of the present invention includes one of the above-referenced electro-optical devices.

In the above arrangements, low-cost electronic apparatus with excellent functionality is provided.

BRIEF DESCRIPTION OF THE DRAWINGS

FIGS. 10(*a*), 10(*b*), and 10(*c*) are plan views illustrating the layout pattern of the pixels of R (red), G (green), and B (blue) colors in the color filter (color layer).

DESCRIPTION OF THE PREFERRED EMBODIMENTS

The embodiments of the present invention are discussed with reference to the drawings. The embodiments are discussed below for exemplary purposes only, and are not intended to limit the present invention, and modifications thereof are possible without departing from the scope of the present invention.

First Embodiment

Figure 1:
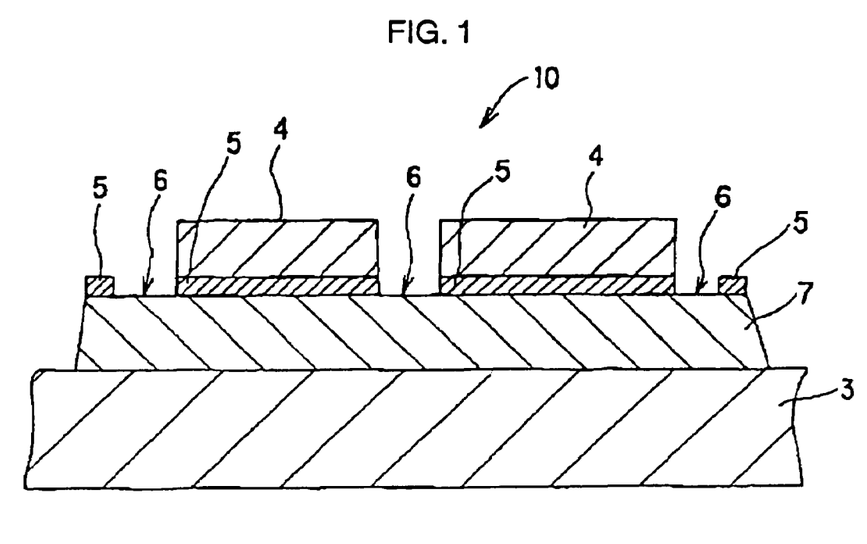
FIG. 1 is a cross-sectional view diagrammatically illustrating one embodiment of the color-filter substrate assembly of the present invention (a first embodiment).

Referring to FIG. 1, a color-filter substrate assembly 10 in a first embodiment includes a substrate 3, a light-shield layer 7 which is arranged on the substrate 3 and substantially shields light, a reflective layer 5 which is arranged on the light-shield layer 7 and substantially reflects light, and a color layer 4 arranged on the reflective layer 5. The reflective layer 5 has an aperture 6 and is covered with the color layer 4.

Referring to FIG. 1, spacing is allowed between adjacent color layers 4. Alternatively, adjacent color layers 4 may be contiguous to each other. In the perspective view thereof from above, the aperture 6 surrounds each pixel region. The same is true of the following embodiments.

Since the reflective layer 5 has the aperture 6 in this way, the light-shield layer 7 is exposed so that the contrast of the light-shield layer 7 is improved.

In this arrangement, light from the outside is reflected from the reflective layer 5, and the reflected light presents an image (in a reflective-type display). The color-filter substrate assembly 10 thus provides excellent functionality and is appropriately used as a color-filter substrate assembly in a low-cost reflective-type display device.

The present invention will be discussed more in detail.

There is no particular limitation to the material of the substrate 3 in the present invention. A planar member having light transmittance, fabricated of glass, quarts or plastic, may be used. However, it is not required in this embodiment that the substrate 3 having light transmittance be used.

The color layer 4 includes R (red), G (green), and B (blue) color layers formed in color layer formation regions on the substrate 3 in a predetermined layout pattern, such as a stripe configuration, a mosaic configuration, or a delta configuration (see FIG. 10). Specifically, the color layer 4 is formed in a color-layer formation region on the substrate 3 by applying a predetermined color resin material such as an acrylic resin, into which a R (red) pigment, for example, is dispersed, using a spin coating method or an ink-jet method and then using a predetermined patterning method (a photolithographic process, for example). In this case, the two-dimensional size of each color-layer formation region is as large as 30 μm×100 μm.

Also, the reflective layer 5 is a film that reflects light entering from the outside. For example, the reflective layer 5 is formed of a film fabricated of a material having light reflectance (such as aluminum, silver, or an alloy thereof, or a laminate thereof with a titanium film, a titanium nitride film, a molybdenum film, or a tantalum film).

In addition, the light-shield layer is used to increase the contrast of an image (using the light-shield function of the black matrix). In accordance with the present invention, the light-shield layer 7 also has the function of scatting light for the reflective-type display.

The light-shield layer 7 is fabricated of a resin that substantially shields light. Available as such a light-shield resin is an epoxy resin into which a black pigment is dispersed.

Second Embodiment

Figure 2:
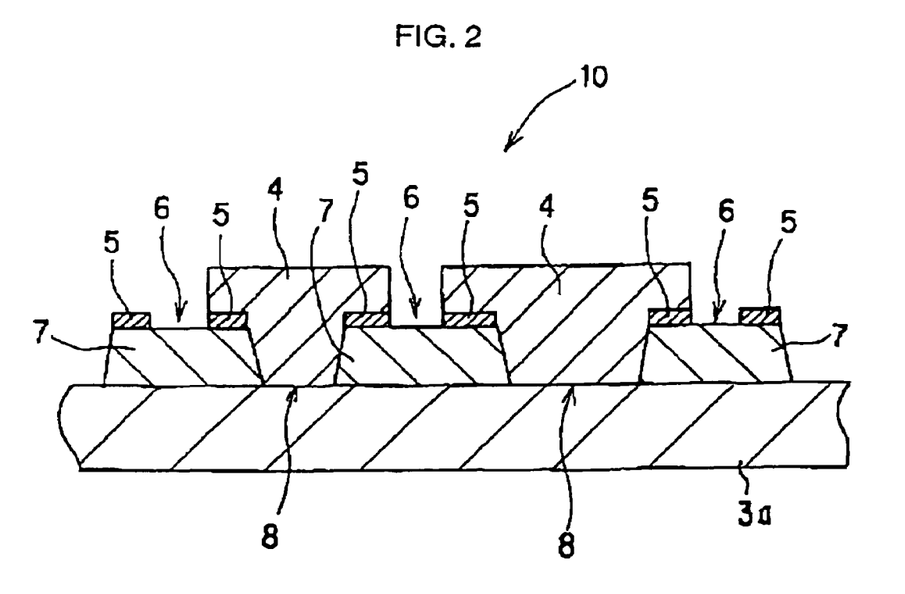
FIG. 2 is a cross-sectional view diagrammatically illustrating one embodiment of the color-filter substrate assembly of the present invention (a second embodiment).

Referring to FIG. 2, the color-filter substrate assembly 10 in a second embodiment includes a substrate 3a which is substantially transparent, a light-shield layer 7 arranged on the substrate 3a, a reflective layer 5 arranged on the light-shield layer 7, and a color layer 4 arranged on the substrate 3a. The light-shield layer 7 has apertures 8, and the reflective layer 5 has apertures 6 and is covered with the color layer 4.

Since the light-shield layer 7 has the apertures 8, incident light from the backlight passes through the aperture 8, and transmits through the color layer 4. The transmitted light thus presents an image (in the transmissive-type display). With the reflective-type display with the reflective layer 5, the color-filter substrate assembly appropriately finds application in a low-cost transflective-type display device having excellent functionality. This embodiment employs a substantially transparent substrate 3a, and the rest of the construction remains unchanged from that of the first embodiment.

Third Embodiment

Figure 3:
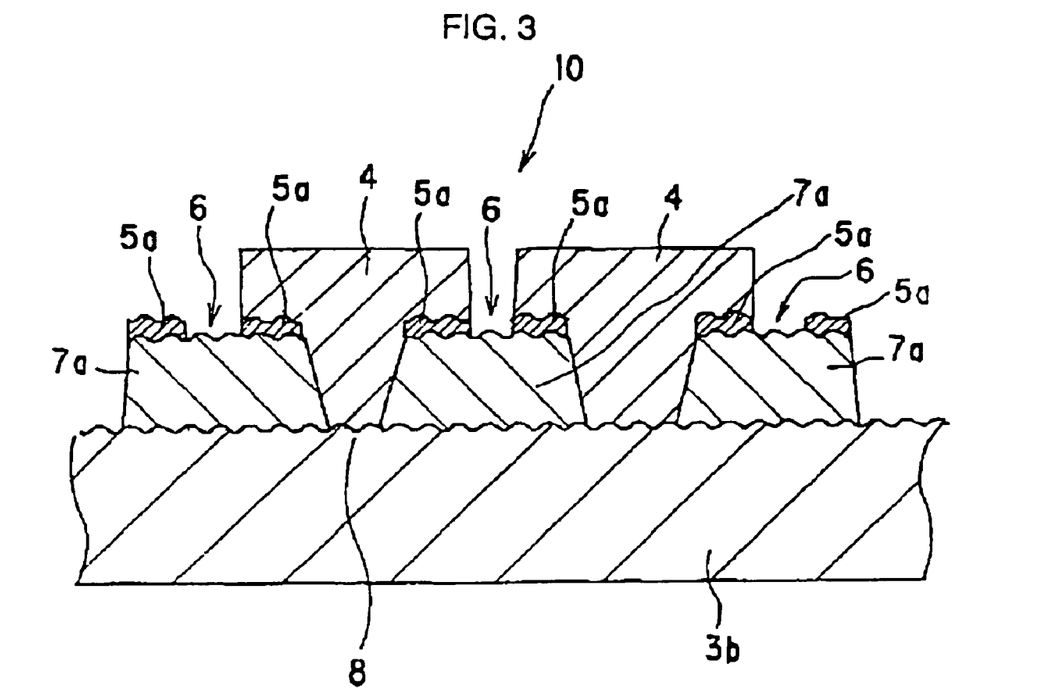
FIG. 3 is a cross-sectional view diagrammatically illustrating one embodiment of the color-filter substrate assembly of the present invention (a third embodiment).

Referring to FIG. 3, the color-filter substrate assembly 10 in a third embodiment employs a substrate 3b having a rugged surface instead of the substrate 3a in the second embodiment. Furthermore, instead of the light-shield layer 7 and the reflective layer 5, a light-shield layer 7a and a reflective layer 5a, each having a rugged surface, are used. Specifically, the color-filter substrate assembly 10 of the third embodiment includes the substrate 3b which is substantially transparent and has a rugged surface, the light-shield layer 7a arranged on the substrate 3b, and having the rugged surface conformal to the rugged surface of the substrate 3b, the reflective layer 5a arranged on the light-shield layer 7a and having the rugged surface conformal to the rugged surface of the light-shield layer 7a, and a color layer 4 arranged on the substrate 3b. The light-shield layer 7a has apertures 8, and the reflective layer 5a has apertures 6 and is covered with the color layer 4.

Instead of the substrate, the light-shield layer and the reflective layer used in the second embodiment, the substrate, the light-shield layer and the reflective layer in the first embodiment may be used with the surfaces thereof that have been roughened (sometimes refered to herein as ruggedized), although they are not particularly shown.

In this arrangement, the light-shield layer 7a having the rugged surface conformal to the rugged surface of the substrate 3b is formed, and the reflective layer 5a having the rugged surface be conformal to the rugged surface of the light-shield layer 7a is formed. The light-shield layer 7a and the reflective layer 5a, each having the rugged surface, are easily produced. With the rugged surface created thereon, the reflective layer 5a appropriately scatters light reflected therefrom. Optical characteristics are thus improved.

Figure 13:
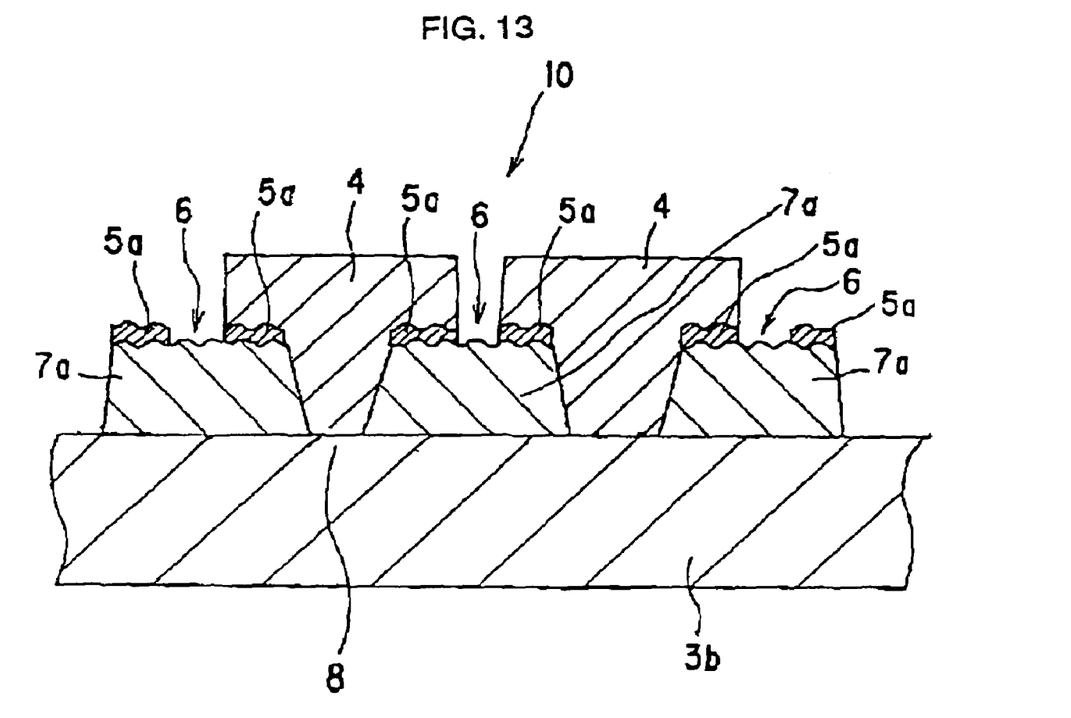
FIG. 13 is a cross-sectional view diagrammatically illustrating a modification of the embodiment (the third embodiment) of the color-filter substrate assembly.

As shown in FIG. 13, the color-filter substrate assembly 10 may employ a substrate 3b having no rugged surface, instead of a substrate 3b having a rugged surface. A light-shield layer 7a having a rugged surface may be directly formed on the substrate 3b, and a reflective layer 5a having a rugged surface conformal to the rugged surface of the light-shield layer 7a may be formed. This arrangement provides the same effect as that discussed above and eliminates a process step for forming the rugged surface on the substrate. The manufacturing process is thus simplified. Since the rugged surface is selectively formed on the light-shield layer 7a, the flexibility of design is widened. The light-shield layer 7a is left with no rugged surface formed in a region thereof where no rugged surface is desired.

Fourth Embodiment

Figure 4:
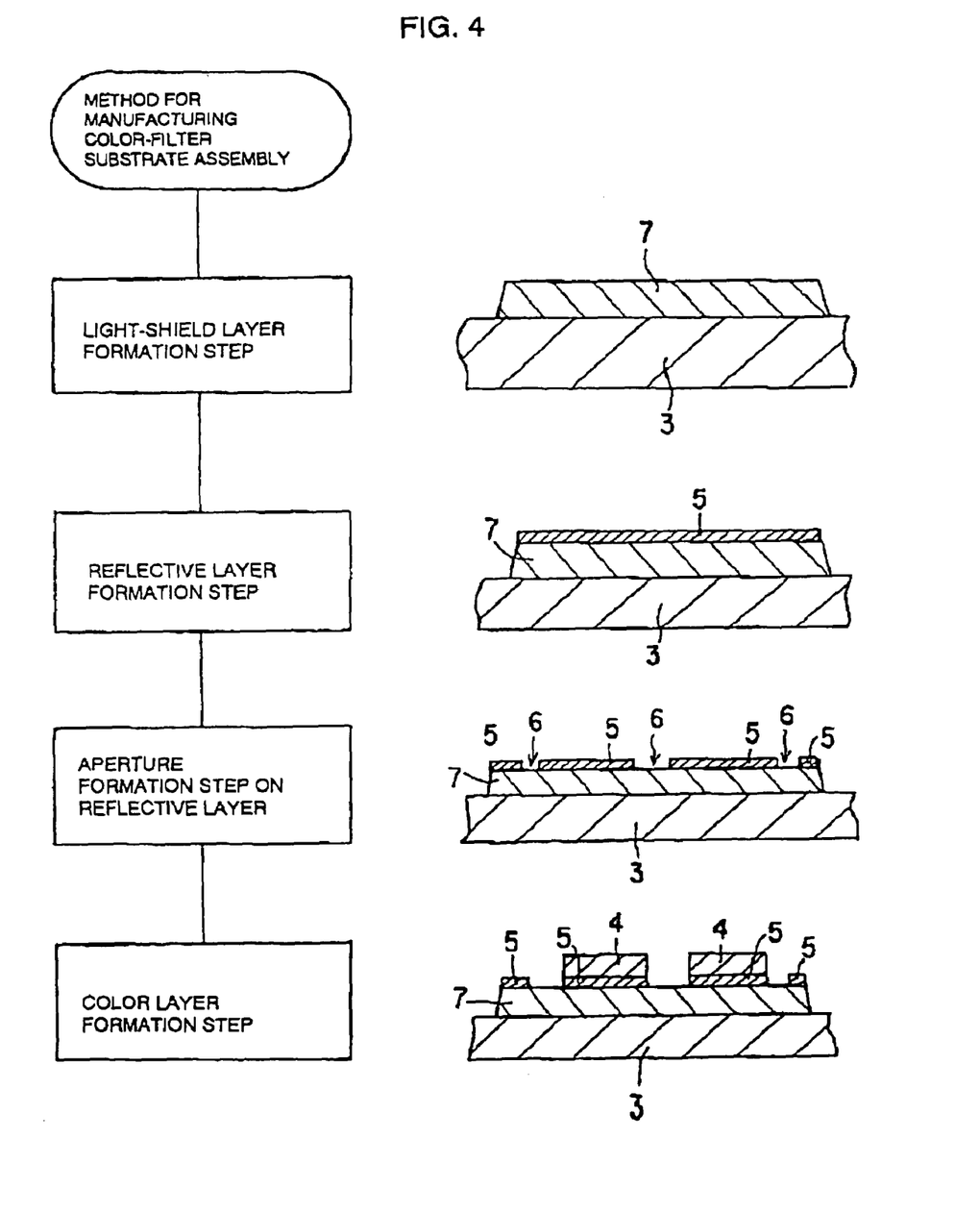
FIG. 4 diagrammatically illustrates process steps of the color-filter substrate assembly in cross section and a method for manufacturing the color-filter substrate assembly in accordance with one embodiment of the present invention (a fourth embodiment).

Referring to FIG. 4, a method for manufacturing a color-filter substrate assembly in accordance with a fourth embodiment includes a step of forming the light-shield layer 7, by applying a substantially light-shield resin, such as an epoxy resin in which a black pigment is dispersed, on the substrate 3 through the spin coating process, and by removing unwanted portions thereof (a light-shield layer formation step), a step of forming the reflective layer 5 on the light-shield layer 7 through the sputtering process (a reflective layer formation step), a step of forming the aperture 6 on the reflective layer 5 through the photolithographic process and the etching process (an aperture formation process on the reflective layer), and a step of forming the color layer 4 on the reflective layer 5 (a color layer formation step).

In this arrangement, a color-filter substrate assembly for use in a reflective-type display device having excellent functionality is efficiently manufactured at low costs.

Fifth Embodiment

Figure 5:
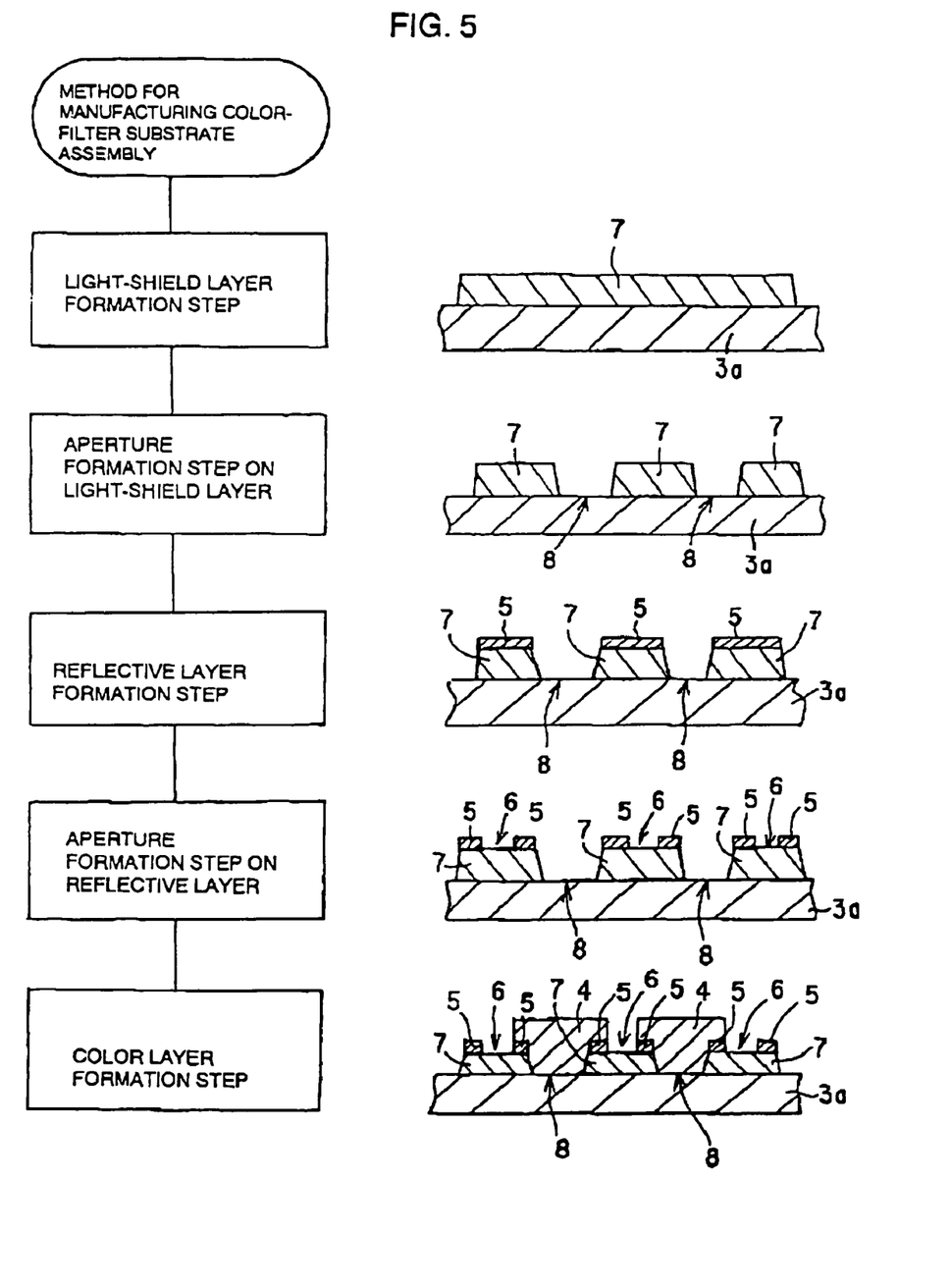
FIG. 5 diagrammatically illustrates process steps of the color-filter substrate assembly in cross section and a method for manufacturing the color-filter substrate assembly in accordance with one embodiment of the present invention (a fifth embodiment).

Referring to FIG. 5, a method for manufacturing a color-filter substrate assembly in accordance with a fifth embodiment includes a step of forming the light-shield layer 7, by applying a substantially light-shield resin, such as an epoxy resin in which a black pigment is dispersed, on the substantially transparent substrate 3a through a spin coating process, and by removing unwanted portions thereof, a step of forming the aperture 8 on the light-shield layer 7 through the photolithographic process (an aperture formation step on the light-shield layer), a step of forming the reflective layer 5 on the light-shield layer 7 through the sputtering process (a reflective layer formation step), a step of forming the aperture 6 on the reflective layer 5 through the photolithographic process and the etching process (an aperture formation step on the reflective layer), and a step of covering the reflective layer 5 on the substrate 3a with the color layer (a color layer formation step).

In this arrangement, a color-filter substrate assembly having excellent functionality and for use in a transflective-type display device is efficiently manufactured at low costs.

Sixth Embodiment

Figure 6:
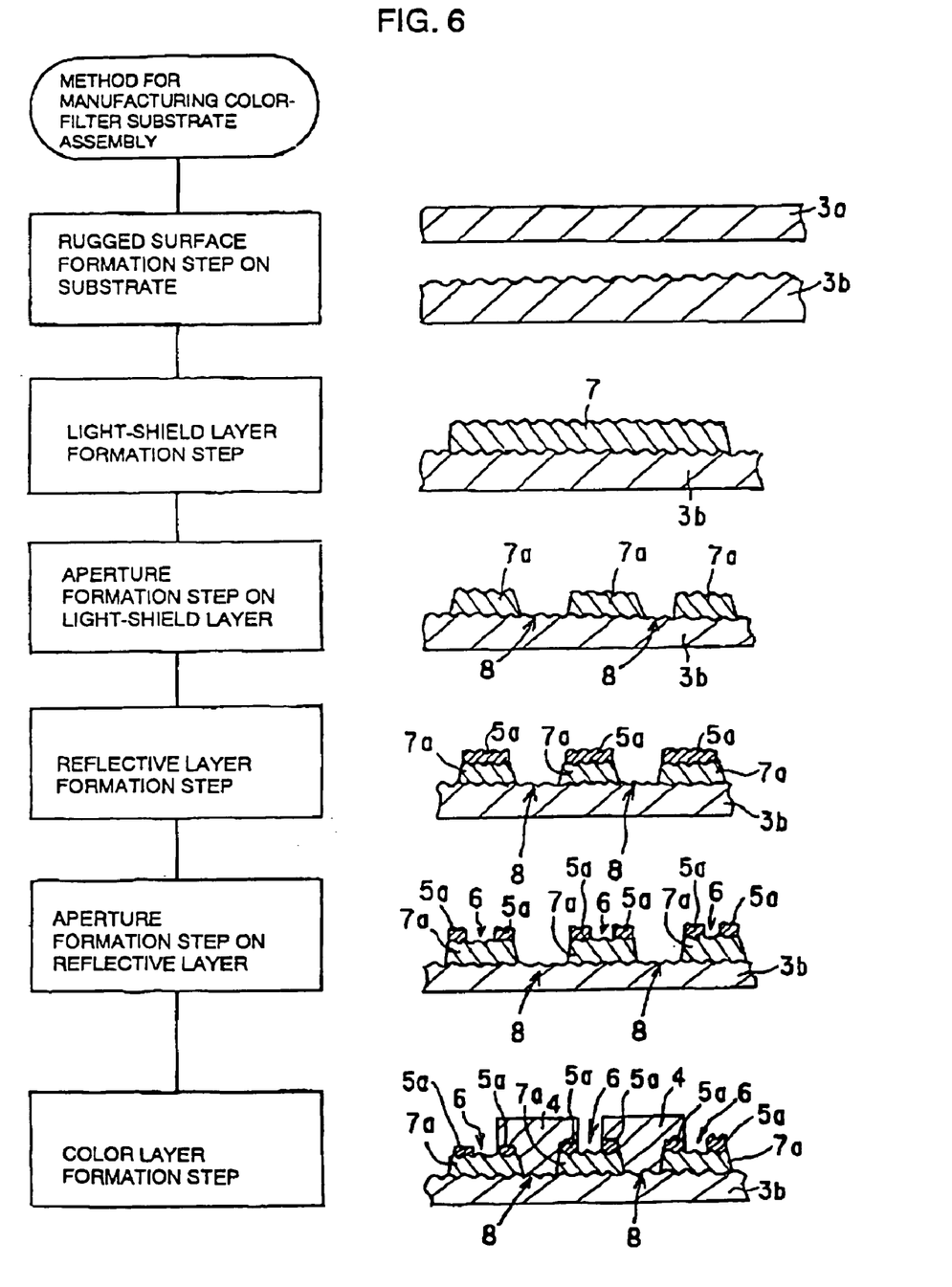
FIG. 6 diagrammatically illustrates process steps of the color-filter substrate assembly in cross section and a method for manufacturing the color-filter substrate assembly in accordance with one embodiment of the present invention (a sixth embodiment).

Referring to FIG. 6, a sixth embodiment of the present invention additionally includes a rugged surface formation step to be discussed later in the method for manufacturing the color-filter substrate assembly in accordance with the fifth embodiment of the present invention.

Specifically, a method for manufacturing a color-filter substrate assembly in accordance with the sixth embodiment of the present invention includes a step of forming the substrate 3b having the rugged surface by ruggedizing the surface of the substantially transparent substrate 3a through the etching process (a rugged surface formation step on the substrate), a step of forming the light-shield layer 7a having a surface configuration conformal to the rugged surface of the substrate 3b, by applying a substantially light-shield resin, such as an epoxy resin in which a black pigment is dispersed, on the substrate 3b having the rugged surface through the spin coating process, and by removing unwanted portions thereof, a step of forming the aperture 8 on the light-shield layer 7a through the photolithographic process (an aperture formation step on the light-shield layer), a step of forming the reflective layer 5a having the configuration conformal to the rugged surface of the light-shield layer 7a on the light-shield layer 7a through the sputtering process (a reflective layer formation step), a step of forming the aperture 6 on the reflective layer 5a through the photolithographic process and the etching process (an aperture formation step on the reflective layer), and a step of covering the reflective layer 5a on the substrate 3b with the color layer (a color layer formation step).

Figure 14:
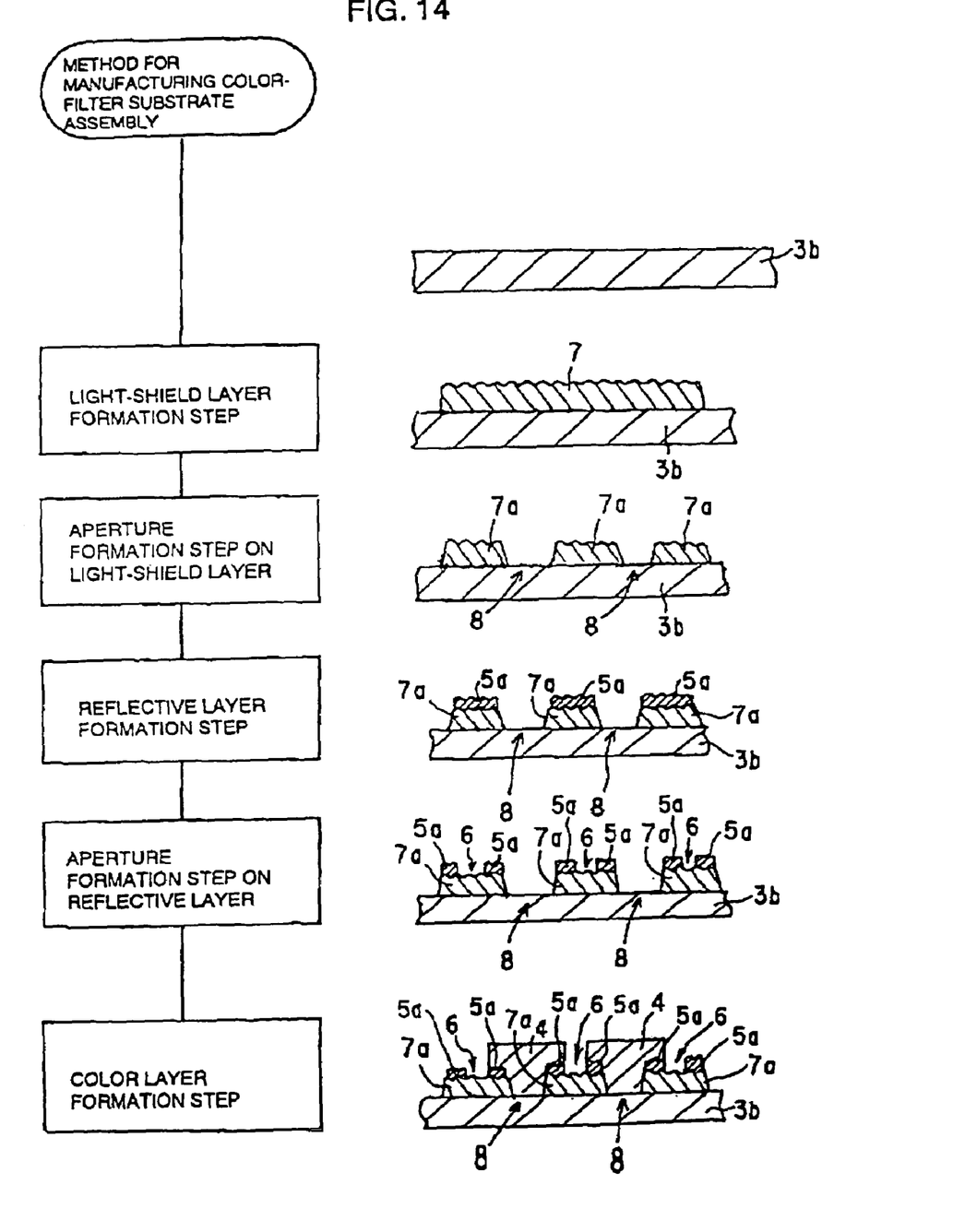
FIG. 14 diagrammatically illustrates process steps of the color-filter substrate assembly in cross section and the method for manufacturing the color-filter substrate assembly in accordance with a modification of the embodiment of the present invention (the sixth embodiment).

In this case, the rugged surface formation step may be skipped. Specifically, referring to FIG. 14, the light-shield layer 7 having a rugged surface may be. directly formed on the substrate 3b having no rugged surface through the photolithographic process and the etching process, and the reflective layer 5a having a surface configuration conformal to the rugged surface of the light-shield layer 7a may be formed on the light-shield layer 7a. This arrangement provides the same effect as that discussed above and eliminates a process step for forming the rugged surface on the substrate. The manufacturing process is thus simplified. Also, since the rugged surface is selectively formed on the light-shield layer 7a, the flexibility of design is widened. The light-shield layer 7a is left with no rugged surface formed in a region thereof where no rugged surface is desired.

In this arrangement, a color-filter substrate assembly having excellent functionality and for use in a transflective-type display device is efficiently manufactured at low costs.

The above-mentioned rugged surface formation step on the substrate may be added to the method for manufacturing the color-filter substrate assembly in accordance with the fourth embodiment, although the process therefor is not illustrated here. Specifically, the surface of the substrate in the fourth embodiment may be ruggedized in the rugged surface formation step on the substrate, and the light-shield layer and the reflective layer in the fourth embodiment may also be ruggedized.

The reflective layer formation step will be detailed in the embodiment of the electronic apparatus of the present invention.

Seventh Embodiment

Figure 7:
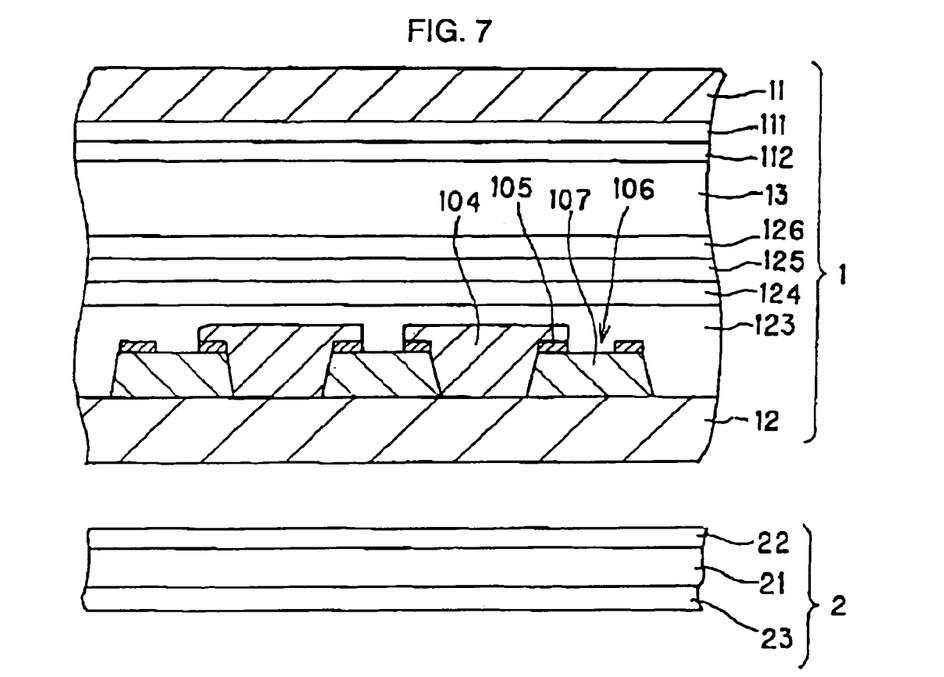
FIG. 7 is a cross-sectional view diagrammatically illustrating an electro-optical device in accordance with one embodiment of the present invention (a seventh embodiment).

Referring to FIG. 7, an electro-optical device (as an active-matrix transflective-type liquid-crystal display device employing a two-terminal switching element) in a seventh embodiment includes a pair of substrates 11 and 12, a light-shield layer 107 which is arranged on one of the pair, namely, on the substrate 12 and substantially shields light, a reflective layer 105 which is arranged on the light-shield layer 107 and substantially reflects light, and a color layer 104-arranged on the reflective layer 105. The reflective layer 105 has apertures 106. The light-shield layer 107, the reflective layer 105 and the color layer 104 arranged on the substrate 12 may have any of the structures illustrated in FIG. 1 through FIG. 3.

The electro-optical device is discussed further in detail.

Referring to FIG. 7, the electro-optical device in the seventh embodiment includes a liquid-crystal panel 1 including a liquid crystal 13 encapsulated between the pair of substrates (the first substrate 11 and the second substrate 12) opposed to each other with a sealing member (not shown) interposed therebetween, and a backlight unit 2 arranged on the second substrate 12 (the one of the pair of substrates) of the liquid-crystal panel 1. Although in practice, a polarizer for polarizing incident light and a retardation film are glued onto the outer surface of each of the first substrate 11 and the second substrate 12 (the side opposite from the liquid crystal 13), these components are neither illustrated nor discussed further because the components are not closely related to the present invention.

The backlight unit 2 includes a linear fluorescent lamp (not shown) for emitting light, a reflector (not shown) for reflecting and guiding the light toward a light guide 21, the light guide 21 for guiding the light from the fluorescent lamp to the entire plane of the liquid-crystal panel 1, a diffuser 22 for uniformly diffusing the light guided by the light guide 21 to the liquid-crystal panel 1, and a reflector 23 for reflecting light emitted from the light guide 21 in a direction opposite from the liquid-crystal panel 1 toward the liquid-crystal panel 1. The fluorescent lamp is not always lit. When no external light is available, the fluorescent lamp is lit in response to a command from a user or a detected signal from a sensor to present a transmissive-type display.

The first substrate 11 in the liquid-crystal panel 1 is a planar member fabricated of glass, quartz, or plastic, and having light transmittance. Arranged on the inner surface of the first substrate 11 (facing the liquid crystal 13) is a plurality of pixel electrodes 111 in a matrix. Each pixel electrode 111 is fabricated of an electrically conductive transparent material such as ITO (Indium Tin Oxide).

Figure 8:
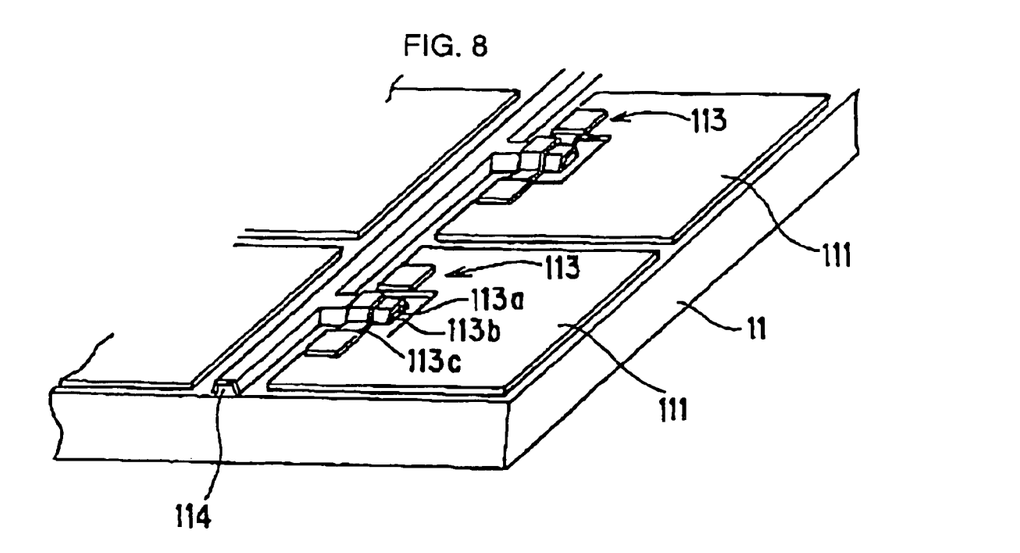
FIG. 8 is a perspective view diagrammatically illustrating a pixel and its surrounding structure in a first substrate of the electro-optical device illustrated in FIG. 7.

FIG. 8 is an enlarged perspective view of the surface of the first substrate 11 on which the pixel electrodes 111 are arranged. It should be noted that FIG. 8 shows the first substrate 11 shown in FIG. 7 up side down.

Referring to FIG. 8, the pixel electrode 111 is connected, through a TFD 113, to a scanning line 114 (extending in a direction perpendicular to the page of FIG. 7) for feeding a pixel voltage. The TFD 113 includes a first metal layer 113a branching off from the scanning line 114, an oxide layer 113b, as an insulator, which is formed by anodizing the surface of the first metal layer 113a, and a second metal layer 113c fabricated of chromium on the oxide layer 113b. The TFD 113 is a two-terminal switching element having non-linear current-voltage relationships. The second metal layer 113c of the TFD 113 is connected to the pixel electrode 111.

Referring to FIG. 7, the surface of the first substrate 11 having the pixel electrode 111 and the TFD 113 formed thereon is covered with an alignment layer 112. The alignment layer 112 is an organic thin film such as of polyimide, and is subjected to a rubbing process to control the alignment direction of the liquid crystal 13 with no voltage applied.

The second substrate 12 includes a laminate of the light-shield layer 107 formed on the surface of the second substrate 12 fabricated of glass, etc., the reflective layer 105 formed on the light-shield layer 107 and having the apertures 106, and the color filter (color layer) 104 covering the reflective layer 105. Furthermore, an overcoat layer 124, counter electrodes 125, and an alignment layer 126 are laminated.

As already described, the reflective layer 105 is fabricated of a material (such as aluminum or silver) having light reflectance, and is used to reflect light incident on the first substrate 11.

Figure 9:
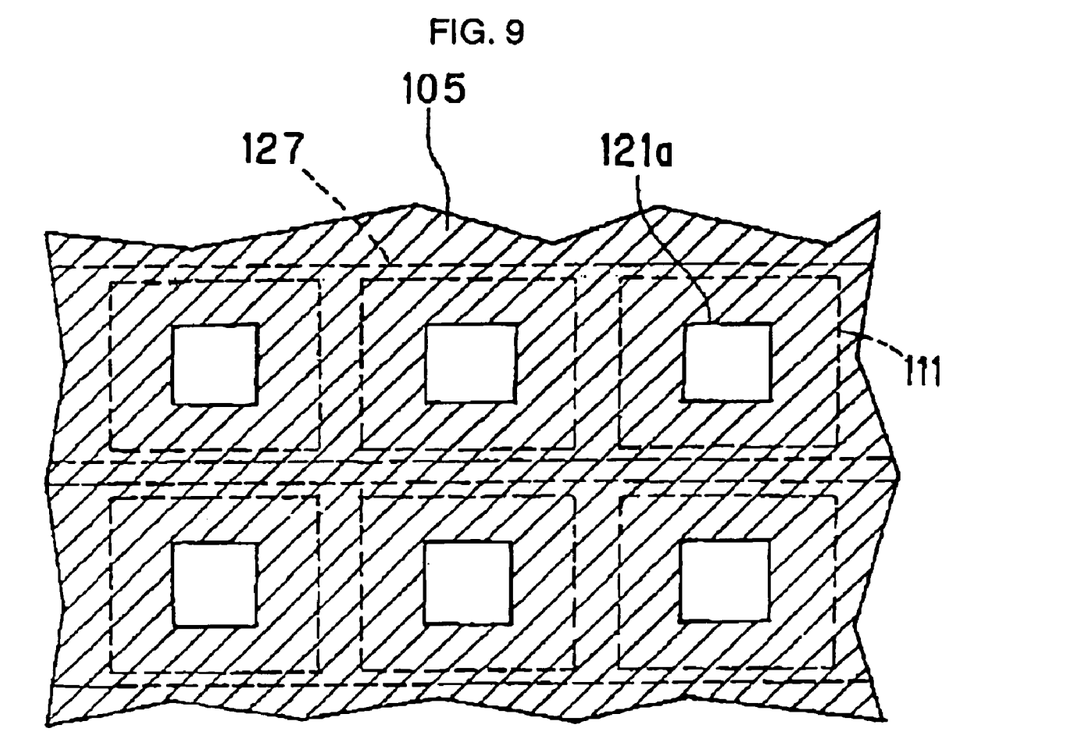
FIG. 9 is a plan view diagrammatically illustrating the structure of a reflective layer in the electro-optical device illustrated in FIG. 7.

FIG. 9 is a plan view diagrammatically illustrating the pattern of the reflective layer 105. Referring to FIG. 9, a region of the reflective layer 105 facing each pixel electrode 111 of the first substrate 11 is represented by a dotted line. Referring to FIG. 9, the reflective layer 105 is formed to generally cover the surface of the second substrate 12 except the aperture 106, which is a portion of the region facing each pixel electrode 111 in the first substrate 11. As will be discussed later, light incident on the backlight unit 2 is passed through the aperture 106 of the reflective layer 105, and is then output from the first substrate 11 to present a transmissive-type display.

The region of the inner surface of the second substrate 12 (specifically, the surface of the light-shield layer 107) covered with the reflective layer 105 (hereinafter referred to a reflective region) has a surface roughness with a fine ruggedness. For this reason, the reflective layer 105 has a rugged surface conformal to the rugged surface of the reflective region.

The color filter (color layer) 104 is a film formed of a resin material colored with R (red), G (green), or B (blue) pigment or dye as already described. The second substrate 12 having the reflective layer 105, the light-shield layer 107 and color filter (color layer) 104 formed thereon is covered with the overcoat layer 124 fabricated of an acrylic resin or an epoxy resin. The overcoat layer 124 planarizes projections formed on the second substrate 12 with the light-shield layer 107, the reflective layer 105, and the color filter (color layer) 104 while preventing the liquid crystal from being degraded by leaks of an organic material into the liquid crystal out of the color filter (color layer) 104.

Further, a plurality of counter electrodes 125 is formed on the overcoat layer 124. Each counter electrode 125 is a band-like electrode extending in a predetermined direction and facing each of the plurality of pixels 111 lined on the first substrate 11. The counter electrode 125 is fabricated of an electrically conductive transparent material such as ITO. The liquid crystal 13 encapsulated between the first substrate 11 and the second substrate 12 changes the alignment direction thereof when a voltage is applied between the pixel electrode 111 and the counter electrode 125. In other words, the region where each pixel electrode 111 faces the counter electrode 125 functions as a pixel.

The aperture 106 of the reflective layer 105 is formed in an area where no light-shield resin layer 12b is formed. The surface of the overcoat layer 124 having the counter electrodes 125 thereon is covered with the alignment layer 126 as the pixel electrodes 111 are covered with the alignment layer 112.

In the above arrangement, the reflective-type display and the transmissive-type display are presented.

In the reflective-type display, the external light such as sunlight or room illumination light is incident on the first substrate 11, travels along a path through the first substrate 11, the pixel electrode 111, the alignment layer 112, the liquid crystal 13, the alignment layer 126, the counter electrode 125, the overcoat layer 124, and the color filter 104, and then reaches the reflective layer 105. The light is then reflected from the reflective layer 105, travels in the opposite direction along the above incoming path, exits from the first substrate 11, and is then observed by the viewer. As described above, the reflective layer 105 has the rugged surface conformal to the rugged surface of the reflective region of the second substrate 12. For this reason, the incident light on the first substrate 11 is reflected from the reflective layer 105 while being scattered from the rugged surface of the reflective layer 105, and is then exits from the first substrate 11. In this arrangement, a scene behind the viewer and the image of the room illumination light are prevented from being reflected.

When the transmissive-type display is presented on the other hand, the light from the backlight unit 2 travels along a path through the second substrate 12, the aperture 8 of the light-shield layer 107, the aperture 122 of a reflective layer 121, a color filter (color layer) 123, the overcoat layer 124, the counter electrode 125, the alignment layer 126, the liquid crystal 13, the alignment layer 112, the pixel electrode 111, and the first substrate 11, and then reaches the viewer.

Eighth Embodiment

A method of an eighth embodiment of the present invention for manufacturing an electro-optical device, includes a step of forming a light-shield layer, which substantially shields light, on a substrate (a light-shield layer formation step), a step of forming a reflective layer, which substantially reflects light, on the light-shield layer (a reflective layer formation step), and a step of forming an aperture on the reflective layer (an aperture formation step on the reflective layer), and a step of forming a color layer on the reflective layer (a color layer formation step).

Ninth Embodiment

A method of a ninth embodiment of the present invention for manufacturing an electro-optical device, includes a step of forming a light-shield layer, which substantially shields light, on a substantially transparent substrate (a light-shield layer formation step), a step of forming an aperture on the light-shield layer (an aperture formation step on the light-shield layer), a step of forming a reflective layer, which substantially reflects light, on the light-shield layer (a reflective layer formation step), a step of forming an aperture on the reflective layer (an aperture formation step on the reflective layer), and a step of forming a color layer to cover the reflective layer on the substrate (a color layer formation step).

The above process steps have been already discussed and the discussion thereof is skipped here. Process steps subsequent to the above process steps are discussed below with reference to FIG. 7.

Subsequent to the above process steps, a resin material such as an acrylic resin is applied on the entire surface of the second substrate 12, and is then fired to form the overcoat layer 124. An ITO thin film is arranged on the surface of the overcoat layer 124 through the sputtering process. The ITO film is then subjected to the photolithographic process and the etching process to form a plurality of band-like counter electrodes 125. An organic material such as polyimide is applied on the overcoat layer 124 having the counter electrodes 125 formed thereon and is then fired to form the alignment layer 126. The alignment layer 126 is then subjected to an axis alignment process in accordance with a twist angle of the liquid crystal 13 (such as a rubbing process).

The scanning line 114, the TFD 113, and the pixel electrode 111 are formed on the first substrate 11. Each of these elements may be produced using any known technique.

A sealing member surrounding the outline of the second substrate 12 is printed on the second substrate 12 thus constructed. The first substrate 11 having the pixel electrodes 111 formed thereon is bonded to the second substrate 12 with the sealing member interposed therebetween. The liquid-crystal panel 1 is then obtained by encapsulating the liquid crystal 13 between the two substrates. The backlight unit 2 is then arranged behind the second substrate 12 of the liquid-crystal panel 1, and then the electro-optical device shown in FIG. 7 is completed.

The embodiments of the electro-optical device of the present invention have been discussed for exemplary purposes only. The above-referenced embodiments may be modified without departing from the scope and spirit of the present invention. The following modifications are contemplated.

In each of the above-referenced embodiments, the liquid-crystal display device is of an active-matrix type with a two-terminal switching element. The present invention is applicable to a liquid-crystal display device using a three-terminal switching element such as TFT (Thin-Film Transistor) and a passive-matrix liquid-crystal display device. As in the above-referenced embodiments, these electro-optical devices include a light-shield layer, a reflective layer having an aperture, and a color filter (a color layer) on one of a pair of substrates encapsulating a liquid crystal therebetween, opposite from the other of the pair facing the viewer. In each of the above-referenced embodiments, the pixel electrodes 111 and the TFDs 113 are arranged on the first substrate 11 facing the viewer and the counter electrodes 125 are arranged on the second substrate 12 opposite from the viewer. Conversely, the counter electrodes may be arranged on the first substrate 11, and the pixel electrodes and the switching elements may be arranged on the second substrate 12. When a three-terminal switching element such as a TFT is used, the substrate facing the viewer serves as an element substrate bearing the switching elements thereon, and the other substrate is a counter substrate bearing the counter electrodes formed thereon. Conversely, the substrate facing the viewer may be a counter substrate and the substrate arranged opposite from the viewer may be an element substrate.

The electro-optical device of the present invention may be applied not only to a liquid-crystal display device but also to an electroluminescent device, an organic electroluminescent device, a plasma display device, an electrophoretic display device, or a field-emission display device.

In each of the above-referenced embodiments, the reflective layer 105 and the counter electrodes 125 are arranged as separate elements on the second substrate 12. Alternatively, a reflective electrode serving the purposes of the reflective layer 105 and the counter electrodes 125 at the same time may be used.

As discussed above, the present invention provides a color-filter substrate assembly which is inexpensive, and provides, in the simple structure thereof, excellent functionality with a light-shield function, such as of a black mask, and a light scattering function for a reflective-type display when the color-filter substrate assembly is used in an electro-optical device (such as a reflective-type liquid-crystal display device or a transflective-type liquid-crystal display device). The present invention also provides a method for manufacturing the color-filter substrate assembly, an electro-optical device, a method for manufacturing the electro-optical device, and electronic apparatus.

The entire disclosures of Japanese patent application numbers 2001-239608 filed Aug. 7, 2001 and 2002-195213 filed Jul. 3, 2002 are hereby incorporated by reference.

What is claimed is:

1. A color-filter substrate assembly comprising:
a light-transmitting substrate that transmits light;
a light-shield layer arranged on the light-transmitting substrate, the light-shield layer having an aperture;
a reflective layer arranged on the light-shield layer, the reflective layer having a first aperture that is aligned with the aperture of the light-shield layer and a second aperture that exposes the light-shield layer through the second aperture; and a color layer covering the reflective layer and the first aperture, but not the second aperture, in the reflective layer.

2. The color-filter substrate assembly according to claim 1, wherein the light-transmitting substrate has a rugged portion on the surface thereof.

3. The color-filter substrate assembly according to claim 1, wherein the light-shield layer includes a surface with a rugged portion.

4. The color-filter substrate assembly according to claim 1, wherein the reflective layer comprises a rugged portion on the surface thereof.

5. A method for manufacturing a color-filter substrate assembly, comprising:

forming a light-shield layer with an aperture on a light-transmitting substrate that transmits light;

forming, on the light-shield layer, a reflective layer with first aperture aligned with the aperture of the light-shield layer and a second aperture that exposes the light-shield layer;

forming a color layer over the reflective layer and over the first aperture, but not the second aperture, of the reflective layer.

6. The method according to claim 5, further comprising forming a rugged portion on the light-transmitting substrate.

7. The method according to claim 5, wherein forming the light-shield layer includes forming a rugged portion on a surface of the light-shield layer.

8. The method according to claim 5, wherein forming the reflective layer includes forming a rugged portion on a surface of the reflective layer.

9. The method according to claim 5, wherein forming the light-shield layer includes forming the light-shield layer from a resin.

10. An electro-optical device comprising:

a pair of substrates including a light-transmitting substrate that transmits light;

a light-shield layer arranged on the light-transmitting substrate, the light-shield layer having an aperture;

a reflective layer arranged on the light-shield layer, the reflective layer having a first aperture that is aligned with the aperture of the light-shield layer and a second aperture that exposes the light-shield layer through the second aperture; and a color layer covering the reflective layer and the first aperture, but not the second aperture, in the reflective layer.

11. The electro-optical device according to claim 10, wherein the light-transmitting substrate includes a surface formed with a rugged portion corresponding to location of the reflective layer.

12. The electro-optical device according to claim 10, wherein the light-shield layer includes a surface with a rugged portion.

13. The electro-optical device according to claim 10, wherein the reflective layer includes a surface with a rugged portion.

14. An electronic apparatus comprising the electro-optical device according to claim 10.

15. A method for manufacturing an electro-optical device, comprising:

forming a light-shield layer with an aperture on a light-transmitting substrate that transmits light;

forming, on the light-shield layer, a reflective layer with first aperture aligned with the aperture of the light-shield layer and a second aperture that exposes the light-shield layer;

forming a color layer over the reflective layer and over the first aperture, but not the second aperture, of the reflective layer.

16. The method according to claim 15, further comprising forming a rugged portion on the substrate.

17. The method according to claim 15, wherein forming the light-shield layer includes forming a rugged portion on a surface of the light-shield layer.

18. The method according to claim 15, wherein forming the reflective layer includes forming a rugged portion on the surface of the reflective layer.

19. The method according to claim 15, wherein forming the light-shield layer including forming the light-shield layer from a resin.

* * * * *